UNITED STATES PATENT OFFICE.

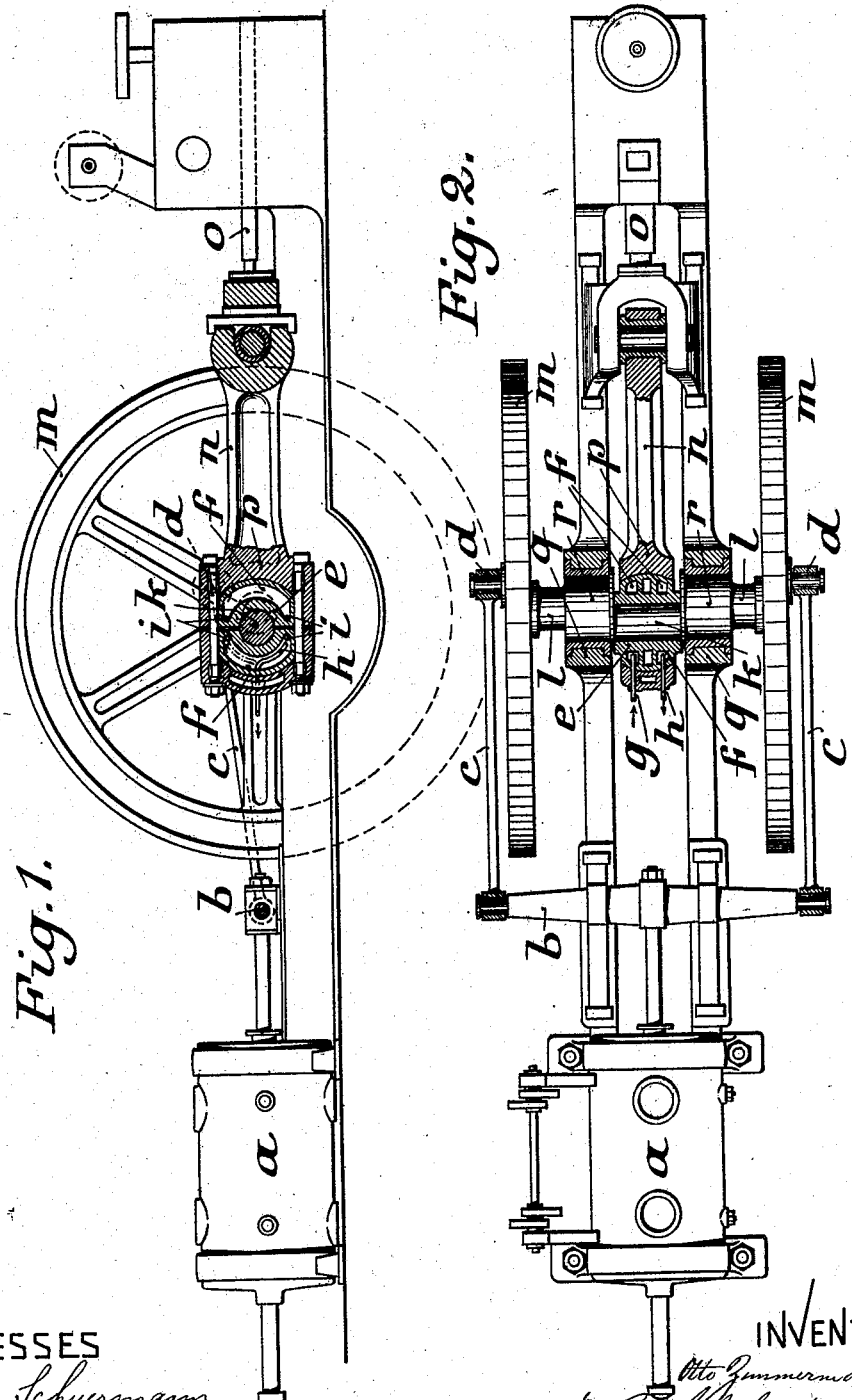

OTTO ZIMMERMANN, OF MAGDEBURG-BUCKAU, GERMANY.

BRIQUET-PRESS.

No. 911,104.  Specification of Letters Patent.  Patented Feb. 2, 1909.

Application filed May 11, 1908. Serial No. 432,165.

*To all whom it may concern:*

Be it known that I, OTTO ZIMMERMANN, engineer, a subject of the German Emperor, King of Prussia, residing at Magdeburg-Buckau, 34 Schönebeckerstrasse, Germany, have invented certain new and useful Improvements in Briquet-Presses; and I do hereby declare the following to be a full, clear, and exact description of the invention, such as will enable others skilled in the art to which it appertains to make and use the same.

This invention relates to a briquet press and consists mainly in an improved arrangement of the crankshaft the pin of the pressure crank being given greater length than was heretofore in use, and the disks of the crank being dispensed with so as to make room for the increased length of pin between the bearings of the crankshaft.

This invention further consists in an improved form of the bush of the pressure crank pin. According to my invention I provide this bush with cooling chambers through which water is made to circulate.

In the accompanying drawings Figure 1 is a side view and Fig. 2 a plan of a press according to my invention the parts to which it specially relates being shown in section.

In briquet presses driven by steam the pressure crank shaft $l$ is operated in a known manner from the piston of the steam cylinder $a$ by means of a traverser or cross head $b$, two connecting rods $c$ and two cranks $d$. The pressure crank $k$ is mounted between two bearings and its shaft $l$ carries a fly wheel $m$ on either side outside the bearings. The motive force stored by these fly wheels during each revolution of the crankshaft is transmitted by the pressure crank to the rod $n$ and to the press plunger $o$ during the working stroke of the press.

In the hitherto known form of briquet presses the pressure crank shaft was provided with separate crank disks on the inside of the crank shaft bearings and between these disks was placed the pressure crank pin.

The high pressure employed in briquet making combined with the shortness of the pressure crank pin hitherto in use frequently caused the heating of the bearing of the crank $k$ in the head $p$ of the rod $n$ and by the heat spreading to the adjoining parts the bearings $q$ of the crank shaft were also frequently found to be heated. Unless a special cooling device is employed it has been found that this heating of the pressure gear and the consequence ensuing can only be avoided by increasing the length of the pressure crank pin. An enlargement of diameter has been found to be of no use. The crank pin might be made longer by increasing the distance between the bearings of the crank shaft and in this case the crank disks hitherto in use might be retained. The distance between the bearings of the crank shaft is however limited by the necessity of constructing the press and the steam engine operating it in one single piece of sufficient strength to withstand the extra high pressure exercised in briquet making. The driving gear of steam distributing valves also forms an obstacle to increasing the distance between the bearings. Greater distance between the bearings would further necessitate greater length of the cross head of the steam engine and consequently greater strength of this part. The cross head at present in use in presses of this kind is however already as strong as it can be conveniently made, both from the technical and the economic point of view. Also a greater length of this part would endanger the equal action of the two rods operating the fly wheels.

According to the present invention I gain the necessary space for greater length of the pressure crank pin without increasing the distance between the shaft bearings by doing away with the crank disks altogether, and joining the crank pin $k$ immediately to the bearing pins or journals $r$ of the crank shaft. By this means nearly the whole thickness of the disks can be added to the length of the crank pin. In the accompanying drawings it will be easily seen that the crank pin $k$ is lengthened in this manner. The diameter of the bearing pin or journal has in consequence to be enlarged so that it substantially equals the diameter of the former disks. Owing to the short stroke of the press crank this enlargement is however not considerable.

In order to effectively prevent heating of the press crank bearing the bushes of this bearing are provided with cooling chambers according to my invention and water is made to circulate through them. In the accompanying drawings $e$ are the bushes, $f$ are the cooling chambers. The water enters the chambers by the pipe $g$ and leaves them by the pipe $h$. The cooling chambers are arranged one behind the other and are connected with each other by openings $i$ so that the cooling medium flows through all the chambers in succession. In order to cause the water to circulate through both halves of the bushing $e$, each half may be provided with separate inlets and outlets $g$ and $h$, or, if it is found desirable to have but a single inlet and outlet, corresponding chambers in the separate halves of the bushing may be connected together by means of short adjustable pipe sections, or by providing the adjacent faces of the bushing with registering orifices and placing a shim or packing provided with similarly disposed orifices between the faces, so that the liquid will be caused to flow from one half of the bushing into the other. The chambers may also be arranged to form a canal winding round the whole bearing.

Having now particularly described and ascertained the nature of my said invention and in what manner the same is to be performed, I declare that what I claim is:

1. In a briquet press, the combination of the press member, the motor therefor, side frames connecting said parts, and a crank shaft journaled in said side frame and serving to operatively connect the motor with the press member, bearings in the side frames for said journals, a chambered bushing on the crank shaft, and inlet and exhaust passages for cooling fluid connected with said chambered bushing.

2. In a briquet press, the combination with the press member, the motor therefor, side frames connecting said parts, a crank shaft provided with journals of larger diameter and an intermediate crank pin, bearings in the side frames to receive the enlarged journals, a chambered bushing on the pin, and inlet and exhaust passages for cooling fluid connecting with said chambered bushing.

In testimony whereof I have affixed my signature, in presence of two witnesses.

OTTO ZIMMERMANN.

Witnesses:
 MARIE SCHNEIDER,
 ALBIN CHRIST.